United States Patent [19]
Babsch et al.

[11] Patent Number: 4,827,124
[45] Date of Patent: May 2, 1989

[54] ELECTRO OPTICAL TRANSDUCER UTILIZING ALIGNED LIGHT CONDUCTORS

[75] Inventors: Alfred Babsch, Ulm; Dieter Beth, Thalfingen; Werner Panzer, Senden; Johann Stempfle, Pfaffenhofen, all of Fed. Rep. of Germany

[73] Assignee: Mannesmann AG, Duesseldorf, Fed. Rep. of Germany

[21] Appl. No.: 734,673

[22] Filed: May 15, 1985

[30] Foreign Application Priority Data

May 19, 1984 [DE] Fed. Rep. of Germany ....... 3418799

[51] Int. Cl.⁴ .............................................. G01D 5/34
[52] U.S. Cl. ................................ 250/231 SE; 250/227
[58] Field of Search ............. 250/227, 231 SE, 237 G; 356/395; 340/347 P

[56] References Cited

U.S. PATENT DOCUMENTS

| | | | |
|---|---|---|---|
| 4,096,383 | 6/1978 | Mancini | 250/231 SE |
| 4,236,070 | 11/1980 | Lee | 250/231 SE |
| 4,240,066 | 12/1980 | Lenox | 250/231 SE |
| 4,430,566 | 2/1984 | Searle | 250/231 SE |
| 4,536,649 | 8/1985 | Kozai et al. | 340/347 P |

Primary Examiner—Edward P. Westin
Attorney, Agent, or Firm—Ralf H. Siegemund

[57] ABSTRACT

Opaque/translucent-transparent markings on a flat track pass through a gap defined by a carrier body sealed in a casing and having peripheral grooves ending at the gap of the body for embedding light conductors connected to light emitting and receiving means aranged generally on opposite sides of the gap.

5 Claims, 3 Drawing Sheets

A common casing for all these parts holds them and they are all sealed therein.

The invention, first of all, avoids certain problems that arise during manufacture, assembly and adjustment of individual parts. Moreover, the direct optical connection as proposed here and involving the conduction of light through plural light conductors from transmitters and light sources to the pick-up transducers establishes per se a higher accuracy concerning the multiple path light transmission, generally and on account of their relationship because the ends of the light wave conductor can be positioned directly adjacent to the operating gap in a very accurate manner and, therefore, in relation to each other and to different portions of the tracks. Subsequent adjustment is completely avoided because the position of the light conductors remains invariant and is basically dependent upon the chosen initial method of manufacture of the device.

This advantageous solution of the problem of well defined scanning of marking tracks is based on the recognition that the fibers may have diameters from 1/10 to ½ of a mm and the manipulation of such fibers in accordance with the invention during manufacture simplifies the construction of the increment sensor considerably.

In furtherance of the invention, it is suggested that the grooves receive different groups of fiber bundles pertaining to different functional circuits. One utilizes here specific property of light conducting fibers: they do not accept interfering light from the outside. Hence, several fibers or fiber bundles can be placed next to each other, they may even touch each other but there is no interference between them as far as the conduction of light is concerned.

Another improvement in accordance with the invention is to be seen in that the carrier body is generally of a construction having a preferred length dimension. One end thereof is provided with the operating gap for the marking track being for example a slotted disk while the other end of this carrier member is provided with a common connection structure for both the light source and the transducer or transducers. The common connection avoids that during installation light source and receiver circuit are confused so that another manufacturing problem is avoided. Moreover, adjustment of optical structure can be avoided as the light fibers are sufficiently accurately positionable by the device and structure itself.

Any inaccuracies concerning position and other optical error sources are avoided by inserting the carrier body into a particular housing. The body assumes a definite position in the housing and is sealed therein subsequently. An accurate position of all the parts in relation to each other is moreover enhanced by providing the aforementioned housing with a latching or locking structure for groups of elements, respectively being light source and receiver groups. These locking means force the aforementioned groups against the carrier body and thus ensure integrity of positioning. The disposition of individual parts is ensured further by using a filler for the grooves so as to embed the light conducting fibers and/or to fill any cavities or spaces between carrier and housing.

The formation of accurate signals without adjustment and without special assembly and mechanical adjusting problems is a desired feature. For this one should use triple diodes and triple photo transistors. Therefore, groups of three light fibers each are associated with the respective making tracks in the operating gap.

Another advantage is derived from covering the common connection member with a light impermeable i.e. opaque cover keeping interfering signals from the generally transparent connecting structure. Compactness, moreover, of the transducer and sensor assembly is attained further by using the aforementioned cover as a printed circuitlike plate to provide for short conductors and a closed compact structure and design.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

Figure 1:
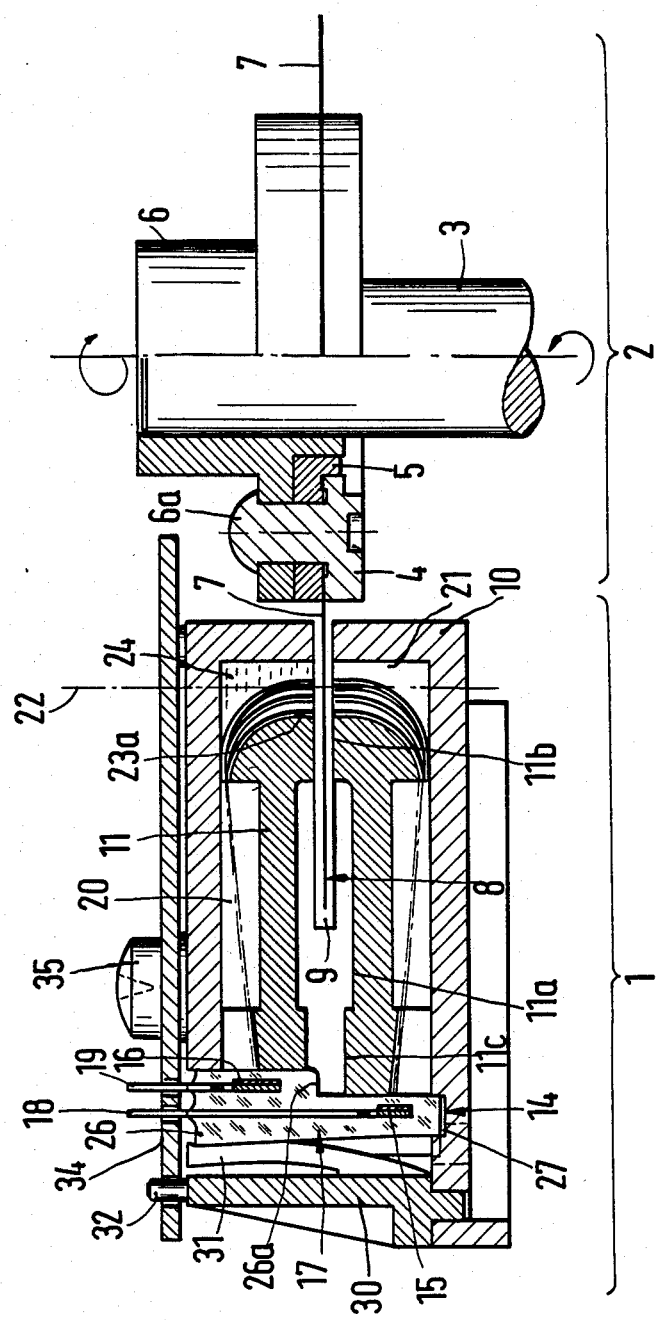
FIG. 1 is a cross section through an increment sensor, transducer and pick-up in accordance with the preferred embodiment of the present invention showing, furthermore, a marking track defining disk.

Proceeding now to the detailed description of the drawings, the figures show generally a rotating machine or equipment part 2 having a shaft 3 carrying a disk 7. The disk is provided with a plurality of altogether three marking tracks 8a, 8b and 8c. The figures, moreover, show a sensing transducing and pick-up system 1 arranged so as to receive in parts the disk 7 and generally scanning the tracks 8a, 8b and 8c. In principle it makes no difference whether these tracks are on a disk and therefore have a curved configuration or are for example on a reciprocating template member or the like. Decisive is that in the range of the scanning of the pick-up device there is strictly a linear movement as far as each of the tracks are concerned. The device 1 generally is provided for generating a plurality of electrical pulses. These pulses are used in open loop or closed loop configuration to control for example the motor or another drive of the shaft, and/or to control other pieces of equipment. Systems' aspects generally are shown in applicant's U.S. Pat. No. 4,673,810, issued on June 16, 1987.

Flange parts 4,5 and 6 and fasteners 6a are provided to connect the round planar disk 7 to the shaft 3. The connection is such that the rotational movement of the disk 7 is an exact 1:1 replica of the rotation of the shaft 3 and therefore of the motor which drives the shaft 3. Generally speaking, motor shaft 3 may be a part of a device or drive to be controlled but amy also pertain to an extremely accurately running calibrating structure in relation to which some other equipment is to be calibrated and the device illustrated therefore produces calibrating pulse sequences.

The marking tracks 8a, 8b and 8c are comprised of slots 12 separated by bars 13. The slots are of course

ELECTRO OPTICAL TRANSDUCER UTILIZING ALIGNED LIGHT CONDUCTORS

BACKGROUND OF THE INVENTION

The present invention relates to an increment sensor, transducer and/or pick-up and constructed for the conversion of either rotational or straight linear movements into a sequence of electric pulses, and more particularly the invention relates to a device of the foregoing kind which includes a light source or other radiation source and a photoelectric transducer and defining between them a monitoring or scanning gap in which a marking track moves, the track being established as a sequence of transparent or translucent markings alternating with opaque markings.

Increment transducers and pick ups of the type to which the invention pertains are generally known and are used, for example, for the open loop or closed loop control of machines, devices or other parts which usually undergo or are supposed to undergo a uniform movement, usually a rotational one or a reciprocal one. A particular example for example is the reciprocating motion of a carriage for a print head in a matrix printer. The matrix head drive runs uniformly and continuously or in uniform steps in order to move the part in between specific positions. Certain operations are to be carried out in these positions. In the case of a printer, of course, these positions are the print positions. The increment sensor generally and the photoelectric device in particular produces pulses which are fairly weak electrical pulses, and they are amplified in suitable circuitry to be raised to a more useful level for purposes of obtaining electrical control.

A known increment sensor is disclosed for example in German printed patent application No. 23 39 874. The particular construction of that publication is chosen to avoid a tumbling motion of the slotted disk vis-a-vis the scanning head. Moreover this known device is usually comprised of four photoelectric receivers such as photo transistors which are arranged along a line being oriented transversely to the direction of movement of the marking track. Each of the tracks will provide in the respective receiver a sinusoidal output and these outputs have respectively relative phase positions 0°, 90°, 180° and 270°. This multiple transducer arrangement is used in order to improve pick-up generally as far as the marking and slot distances are concerned. Accordingly two scanning devices for two sinusoidal signals are associated with a single slot. This arrangement is supposed to suppress the effect any tumbling motion of the disk in relation to the phase relations, pulse sequences is supposed to have. These phase relations are apparently easily adjustable because the two scanning devices, each including light source and receiver, are arranged on a common carrier which is pivotable and arrestable for pivot motion about a point which is situated between the two scanning devices. It was found, however, that an angle adjustment of the row of the transducers is not quite adequate to solve the problem; not even a major aspect of the problem because during initial installation and adjusting of the parts vis-a-vis each other further inaccuracies and tolerances arise, so that in fact the adjustibility of the increment sensors vis-a-vis two parallel arranged marking tracks becomes increasingly difficult.

Another aspect of the known device is that the mere mechanical adjustment of parts does not suffice. Particularly in the case of high speed operation electrical problems related to that high speed are encountered. Such a problem relates for example to the requisite adjusting of the operating point in the receiver and the transducers. Also, problems arise on account of varying operating temperatures of light source and receiver; the light source in particular is subject to aging if, as is common, such a source is constructed as a light emitting diode.

Another problem is to be seen in that any photo transistor when used as a pick-ip transducer offers per se two basic drawbacks. One drawback is that with rising temperature their gain increases while on the other hand with increasing frequency the gain reduces. The light emitting diode when used as source photo transistors because the luminous output decreases also with increasing temperature. However, this type of compensation is effective only if the temperature dependency of the photo transistor is at least approximately expressable by the same factor as the power drop of the light emitting diode. Generally speaking this equality cannot be expected. Therefor, on the basis of the physical conditions, manufacturing problems are to be expected.

DESCRIPTION OF THE INVENTION

It is an object of the present invention to provide a new and improved track increment sensor overcoming the drawbacks outlined above and particularly reducing expenditure for adjustment, both electrical and mechanical, while increasing accuracy concerning signal formation while reducing complexity of scanning several marking tracks as far as optical arrangements are concerned.

It is therefore a specific object of the present invention to provide a new and improved increment track sensor, transducer and pick-up for the conversion of linear movement such as straight linear of rotational movement into electrical pulse sequences and including a light source and a photoelectric transducer, as well as at least one marking track moving in and through an operating or sensing gap situated between the source and the transducer.

In accordance with the preferred embodiment of the present invention, the improvement as it relates to the specific object is comprised of providing an optical connection between light source and transducer by means of light wave conductors, whereby, basically, a single light wave conductor that interconnects source and pick-up is merely interrupted in the operating gap area in which the marking track is moving under observation of the condition that adjacent to this gap and as hypothetically continued through the gap, the axis of the light conductor extends precisely transverse to the direction of movement of the marking track in that gap.

The conductors are provided in the plurality for reasons of multiple scanning which is to be understood in a twofold fashion: there are multiple marker tracks and each track is scanned in a multiple fashion. The gap is structurally realized, established and maintained by a carrier body which includes its own gap and is positioned so that the latter gap in fact coincides with the gap between the conductors so that one can speak of a common gap. The carrier body has peripheral grooves in and along its periphery. These grooves extend towards the common gap and in pairs from opposite sides thereof; the grooves end at that common gap and they receive the conductors and have them embedded.

transparent or translucent while the bars 13 are opaque. Preferably bars and slots are equally wide. The disk 7 itself is usually made of metal. Alternatively, the disk 7 may be made of glass or other transparent material upon which opaque markings have been placed for example by photographic process or otherwise. In any event, these marking are about 0.1 mm wide, and in case disk 7 is made of glass, aluminum may have been vapor deposited and photographic-etching procedure established the marking and slot pattern.

Turning now to the transducer assembly, there is shown a housing or casing 10, generally, which carries a carrier body 11. Both have a certain gap defining specifically the gap 9 in which disk 7 moves. Housing or casing 10, moreover, includes a light transmitter - light receiver modular group 14 which gapfree abuts and bears against the carrier 11. This group 14 includes a light source 15 and, a particularly advantageous feature, the transducer 16 is also included in that group. Both, element 15 and element 16 are arranged in a uniform body 17 made of transparent material and they are provided with embedded connecting lines 18 and 19.

The connecting lines 18 and 19 run to an amplifier circuit outside of the system, not shown, which raises the signal level to a more practical one and possibly provides modulation - demodulation and/or digitalization. In other words, the amplification circuit changes for example the sinusoidal signals into square shaped pulses. This is not part of the present invention (see e.g. the copending application).

The optical connection between light source 15 and transducer 16 is provided generally through light wave conductors 20. Reference numeral 21 defines a zone in the gap 9 in which the light conductors 20 run precisely perpendicular to the extension of the gap 9 and particularly to the plane of rotation of disk 7. The light conductors are, moreover, arranged in pairs along the same axis 22 so that in fact one can postulate a hypothetical continuation of each of these light fibers through the gap 9. This gap 9 is thus a common gap for the carrier body 11 and for the light wave conductors 20.

The light conductors 20 are made, as stated, from glass fibers being between 1/10 and ½ mm thick. These fibers are identified individually by reference numerals 28b and 28c. Prior to cutting gap 9, for example, by way of milling these fibers are wound in peripheral grooves 23 of the carrier body 11 so that particularly their position in the range 21 depends exclusively on the arrangement and extension and configuration of the respective bottom 23a of each groove. Following winding, the grooves 23 are closed by an embedding and filling mass 24 being e.g. of a pasty or more or less solid state and fixing the position of the fibers 20a, 20b, 20c in the groove. Moreover, additional filling material 24 may be provided to fill any and all other gaps between the housing or casing 10 and the carrier 11 so that in fact no cavities remain.

Figure 4:
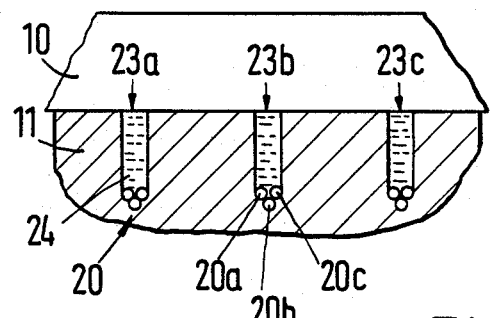
FIG. 4 is a vertical cross section through the grooves of the carrier body receiving light fibers and constructed particularly for a system with triple light emitting diodes and triple photo diodes.

Basically, for each light transmitter and for each transducer 16 one needs just two light conductors such as 20 in order to obtain a particular phase shifted signal at the output lines 18 and 19. These signals are fed to an amplifier circuit as was mentioned above. However, in accordance with the particular illustrated embodiment of the invention and reference is made here particularly to FIGS. 2 and 4 a maximum degree of accuracy is attempted an and the system provides that the grooves 23 receive groups of three conductors 20 whereby particularly in the central groove 23b, fibers 20a, 20b and 20c are provided. The copending application elucidates on the advantages.

The light source 15 is established by a triple light emitting diode and the transducer 16 is realized by a triple photodiode. Fibers 20a and 20c establish the outermost position; these light fibers 20a and 20c produce signals which lead and lag respectively by 90 degrees in relation to a reference signal that runs through the central fiber 20b.

The reference signals is, as far as time is concerned, always, so to speak, in the middle between the signals from the outer path (track borders or margins), so that in terms of desired sinusoidal modulation the two outermost signals are phase shifted by 180° in relation to each other. The phase relation can be maintained with sufficient accuracy. The outer two signals are digitized, i.e. squared in the amplifier as was mentioned above.

The carrier body 11 is of oblong construction, i.e. the shape 11a has a preferred dimension of extension including two ends 11b and 11c. The operating (common) gap 9 is provided adjacent the end 11b while a common connecting member 26 for light transmitter 15 and transducer 16 is provided at the other end 11c. A step 26a is provided for positioning the devices 15 and 16 in relation to the light wave conductor system 20.

The transparent connecting member 26, moreover extends into a recess 27 of body 11 to obtain optical coupling to the highest degree of accuracy possible. After carrier body 11 has been inserted in the housing 10 the body is additionally sealed as illustrated by the connecting "points" 28 and 29 in FIG. 2. Subsequently the connection member 26 is slipped onto the end 11c of the carrier 11 and is held in addition by a locking structure 30 including a spring 31 in order to maintain positive contact and connection to the body 11.

The locking member 30 is provided, moreover, with guide pins 32 and 33 covered by a cover 34 being in turn held by means of screw 26 in the respective threaded appertures 36 of the housing 10. The light transmitter-receiver group 14 constitutes as stated as such a uniform module, i.e. it is a separate self container unit which can be easily exchanged without changing any of the physical parameters of the sensor as such.

Figure 2:
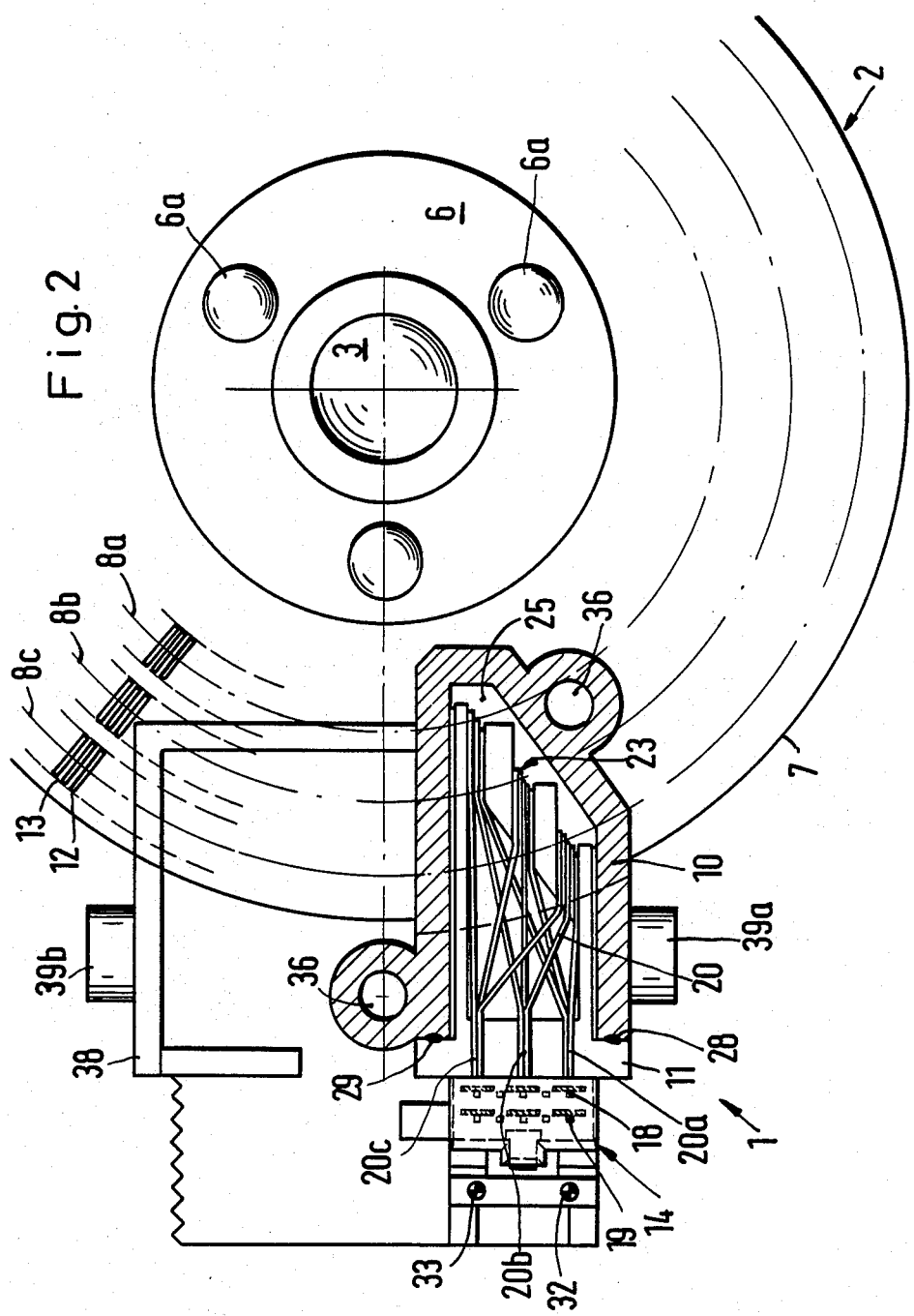
FIG. 2, shows the device shown in FIG. 1 but in top elevation and cross section in parts.
Figure 3:
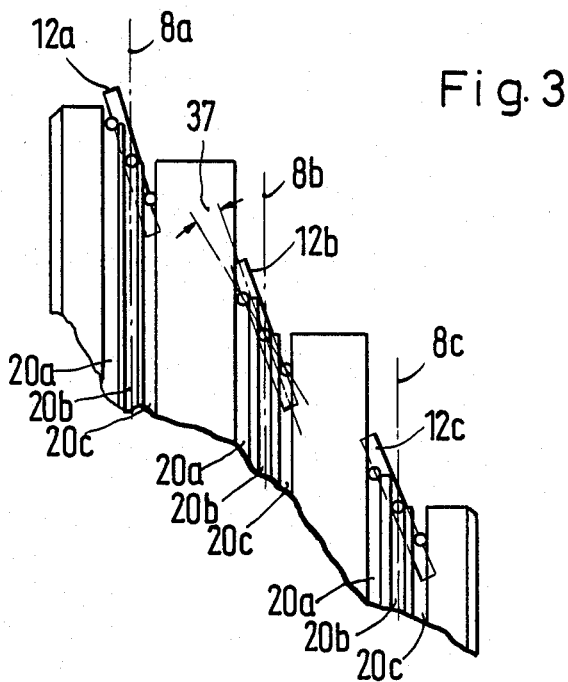
FIG. 3 illustrates on an enlarged scale a detail of the device shown in FIG. 2 illustrating particularly the arrangement of light conducting fibers above three tracks.

FIG. 3 taken in conjunction with FIG. 2 illustrates the invention in fuller detail as far as an extensive system is concerned and commensurate with the system in our copending application. The three marking tracks 8a, 8b and 8c can for example be scanned independently from each other. Therefore, there are three groups of three light fibers 28,b,c and they are arranged above the slots 12a,b,c oriented at an acute angle 37 but being parallel to a plane in the cross section as far as the gap 9 is concerned. The angle 37 is required in order to make sure that there is 180 degrees phase shift between each of the outer signals of a marking track 8a,b,c. The angle 37 so to speak translates the modulation provided by the marking and the lateral extension of the markings into relation that permits extraction of the desired phase between different signals as derived from the same track. A lateral extension 38a of the housing 10 has a lateral nose 39a. A portion of housing 10 in opposite orientation carries a latching nose 39b. These noses are provided in order to fix the position of the sensor 1 as a whole in relation to other stationary equipment.

FIG. 2, moreover, illustrates a particular parallel circuit connection involving all three marking tracks and the respective scanning and pick-up equipment. In this case particularly one combines from all three marking tracks 8a,8b,8c the respective radially outer light conducting fibers 28a as inputs for a triple transducer provides in form of a triple photo diode 16. The respective middle light conducting fibers 20b are associated with another element of the threefold transducer (triple diode) 16 and the other respective outer light conducting fibers 20c are associated with a third element of the triple diode 16.

The individual elements of the threefold light emitting diode 15 are associated with light conducting fibers 20a,20b, and 20c respectively for each marking track 8a,8b and 8c. By way of example, a alight conductor of fiber such as 20a runs from one of the three diodes 15 to the common gap so that its light emitting exit window is situated above a margin of one of the tracks such as 8a and is continued on the other side of gap 9 and of disk 7 towards one of the transducers 16. The same transducer will receive light from two other fibers beginning at that two other diodes and traversing comparable margins of the two other tracks 8b and 8c. The situation is analogous as far as the light from the two other light emitting diodes is concerned. Therefore, the threefold light transmitter 15 and the threefold transducer 16 provide in all of the three groups of three light conducting fibers 20a,20b and 20c similar physical quantities. This feature makes sure that a very accurate mode of signal formation is provided which does not require any adjustment tuning, trimming or the like and will in fact adjust to the respective temperature conditions prevailing throughout. The cross-over feature is shown in detail in our copending application.

The invention is not limited to the embodiments described above but all changes and modifications thereof, not constituting departures from the spirit and scope of the invention, are intended to be included.

We claim:

1. Increment sensor and transducer for the generation of electrical pulses in response to markings on a flat track, the markings being defined by alternating sequences of transparent or translucent and opaque elements, there being means for defining a gap through which said track passes; first means arranged on one side of said track and providing for the emission of light; and second means arranged on an opposite side of said gap and provided for receiving a light signal and converting same into electrical signals; the improvement comprising in combination:

a plurality of light conductors arranged between said first and said second means, across said gap, but being interrupted in said gap, so that the hypothetical continuation of the light conductor through the gap runs precisely perpendicular to a direction of extension of said gap and to a plane of movement of said track in said gap;

a carrier body which includes a gap being situated so that its gap coincides with the gap of said conductors so that there is a common gap, the body further having peripheral grooves in and along the periphery of the body and towards the common gap and in pairs from opposite sides of the common gap and ending at the common gap for receiving said light conductors, said light conductors being embedded and sealed in said grooves; and a casing, there being sealing means for accurately positioning said body in said casing and for maintaining said position of said body in said casing.

2. The improvement as in claim 1, said peripheral grooves in said carrier body respectively receiving different groups of light conducting fibers which include said conductors, said first and said second means including plural light sources and plural light receivers, respectively.

3. The improvement as in claim 1, wherein said carrier body is of generally elongated construction and including a portion of said common gap and having an end remote from said common gap, optical connection means for optical connecting the light conductors to the first and second means.

4. The improvement as in claim 1, said sealing means, also completely sealing the grooves as well as any other gaps and spaces between the carrier body and the casing.

5. The improvement as in claim 3, and including an opaque cover for the optical connection means.

* * * * *